United States Patent [19]

Yamada et al.

[11] Patent Number: 4,673,989
[45] Date of Patent: Jun. 16, 1987

[54] METHOD AND APPARATUS FOR RECORDING PLURAL IMAGES WITH DESIRED LAYOUT BY AN IMAGE REPRODUCING SCANNER

[75] Inventors: Mitsuhiko Yamada, Kyoto; Hideaki Kitamura, Osaka, both of Japan

[73] Assignee: Dainippon Screen Mfg. Co., Ltd., Japan

[21] Appl. No.: 807,521

[22] Filed: Dec. 11, 1985

[30] Foreign Application Priority Data

Dec. 15, 1984 [JP] Japan .................................. 59-264858
May 21, 1985 [JP] Japan .................................. 60-106807

[51] Int. Cl.⁴ .............................................. H04N 1/04
[52] U.S. Cl. ..................................... 358/287; 358/289; 358/293
[58] Field of Search ................ 358/287, 77, 293, 289; 382/47; 385/23

[56] References Cited

U.S. PATENT DOCUMENTS

4,322,161 3/1982 Mohr ...................................... 355/23
4,622,582 11/1986 Yamada ................................ 358/280
4,622,591 11/1986 Katsuyama et al. ................. 358/256

Primary Examiner—Edward L. Coles, Sr.
Attorney, Agent, or Firm—Ostrolenk, Faber, Gerb & Soffen

[57] ABSTRACT

A method and apparatus for recording plural images with desired layout by an image reproducing scanner in which frames on which images to be reproduced are moved relatively to an optical axis by maintaining a layout sheet which represents area frames on a projecting plane of a projector. The original pictures to be reproduced are mounted on a movable and rotatable original picture holder along a plane intersecting perpendicularly with the optical axis. The desired areas on which the original pictures are projected are focused by adjusting magnification ratio etc., and a pick-up scanning drum and the above described data are stored as control data. Repeating the above described, the pick-up drum on which the original picture are loaded is set up so that reproduced patterns may be recorded according to the control data.

2 Claims, 9 Drawing Figures

METHOD AND APPARATUS FOR RECORDING PLURAL IMAGES WITH DESIRED LAYOUT BY AN IMAGE REPRODUCING SCANNER

FIELD OF THE INVENTION

The present invention relates to an image reproducing scanner which controls scanning means for recording by picture signals obtained by photoelectrically scanning the original picture and records reproduced picture images, and particularly relates to a method and an apparatus for setting up one or a plurality of original pictures on a layout sheet to be applied to a layout scanner which records the original pictures according to desired layout and trimming manner.

Conventionally, works for recording one or plurality of original pictures according to a desired layout by using a layout scanner have been carried out according to the following steps.

(a) As a preliminary step, each of the original pictures is set on a pick up drum of the scanner with a desired angle (that is, with an angle by which frame lines which surround a desired reproduced area are parallel to the scanning direction), a rectangular area a little larger than the above described reproduced area is scanned as a superposed trimming area the pick-up scanning, and image data within the area are stored in a memory means in the layout scanner.

(b) Trimming frames regarding each of the images are represented on a color monitor picture plane of the layout scanner by corresponding to the designated layout area.

(c) The stored original pictures are read out to represent the images on the color monitor, then, other images represented so that it may align to the trimming frame which corresponds to the images are shifted, fixed at a position at which they align with each other, and by obtaining the position, the image data including in the trimming frame are stored in a memory means for output image data.

(d) By repeating steps of the above described (a)-(c) regarding all of the original pictures, the layout working is completed. In the conventional layout workings there have been the following problems; that is, (1) In order to take a trimming area superposed to the original picture larger than an area to be actually reproduced, it is required to provide a memory means having large capacity.

(2) Since alignment of each of the images to the trimming frame is to be performed on the picture plane of the color monitor, accuracy in positioning is limited to lower than resolving power of the color monitor. For this reason, for example, in such a case in which positioning a full page layout is carried out by displaying on the color monitor, it is difficult to have fine positioning.

(3) To carry out each of the above described steps for the respective original pictures by using the expensive layout scanner is uneconomical for efficiency of the layout scanner being lowered.

As one of the means for improving the above described problems, there are some publications, and among them the invention disclosed by the Japanese Patent Laid-Open Publication No. 59-58430 (The Assignee of the application is Dainippon Insatsu Kabushiki Kaisha) is adapted that position data of a point in diagonal lines in a desired rectangular reproduced area on the original pictures loaded on the drum of the scanner, on the other hand from the position data of the diagonal point corresponding to an area to be reproduced of the original pictures on a layout sheet, reproduction magnification thereof etc., a trimming area to be picked-up in scanning operation is determined. However, there are some disadvantages in the disclosed invention as follows.

(1) Operation becomes very complicate caused by superposing the reference point to the original pictures.

(2) If a setting angle of the original picture is inaccurate, accuracy of positioning is remarkable lowered.

(3) Resolving power on the pick-up drum of the scanner depends on accuracy of a rotary encoder which is provided to the drum, accordingly, in general, it has low accuracy which results in difficulty of positioning.

(4) It is very difficult to align a setting angle of the original pictures exactly.

(5) When a plurality of original pictures are reproduced to a picture image by composing them, position data regarding the reference point at each of the original pictures on the scanning drum must be obtained, and further complicate processing for processing them in a lump is required.

SUMMARY OF THE INVENTION

It is an object of the present invention to provide a method and an apparatus for setting up a desired scanning area without disposing a reference point or a reference line on an original picture(s).

It is another object of the present invention to provide a method and an apparatus for loading one or a plurality of original pictures on the pick-up drum with a desired setting angle.

It is further object to provide a method and an apparatus for composing one or a plurality of original pictures on a layout sheet by a scanner for reproducing a desired area of the original picture(s) by automatically trimming the original pictures.

In the present invention it is adapted that one of among a plurality of original picture is maintained in an original picture holder which can move parallel in the direction of X axis and that of Y axis and rotate in the direction of Z axis, each of picture images of the original picture is projected on a layout sheet on which a trimming area to be reproduced with respect to the respective original pictures is drawn by an optical projector which can vary magnification of picture images of the original pictures, and the position of the original holder, angle and magnification of the projector are adjusted so that picture images of desired reproduced areas in the original picture may be aligned to the corresponding trimming area on the layout sheet. Thus, data of position of the original holder in the X and Y axes directions, magnification etc. are input to a memory means and stored therein.

On the other hand, at the original holder side a pick-up drum (or transparent base) of the scanner on which the original pictures are set-up with the same level with the original holder is disposed, and the original pictures having finished data input are transferred to the pick-up drum without varying the angle with which the picture image of the reproduced area is aligned to the trimming frame by moving the original holder in parallel, and are set up.

To the pick-up drum a rotary encoder which measures rotational angle from the origin is attached, and the rotary encoder inputs position data of the set-up point of the origin to the memory means and stores them. With respect to predetermined original pictures, each of the above described workings is repeated, and when storing set-up and position data of all the original picture is finished, the pick up drum is loaded on the scanner, and by using each of the data stored in the memory means, pick-up scanning is carried out.

DESCRIPTION OF PREFERRED EMBODIMENT

Figure 1:
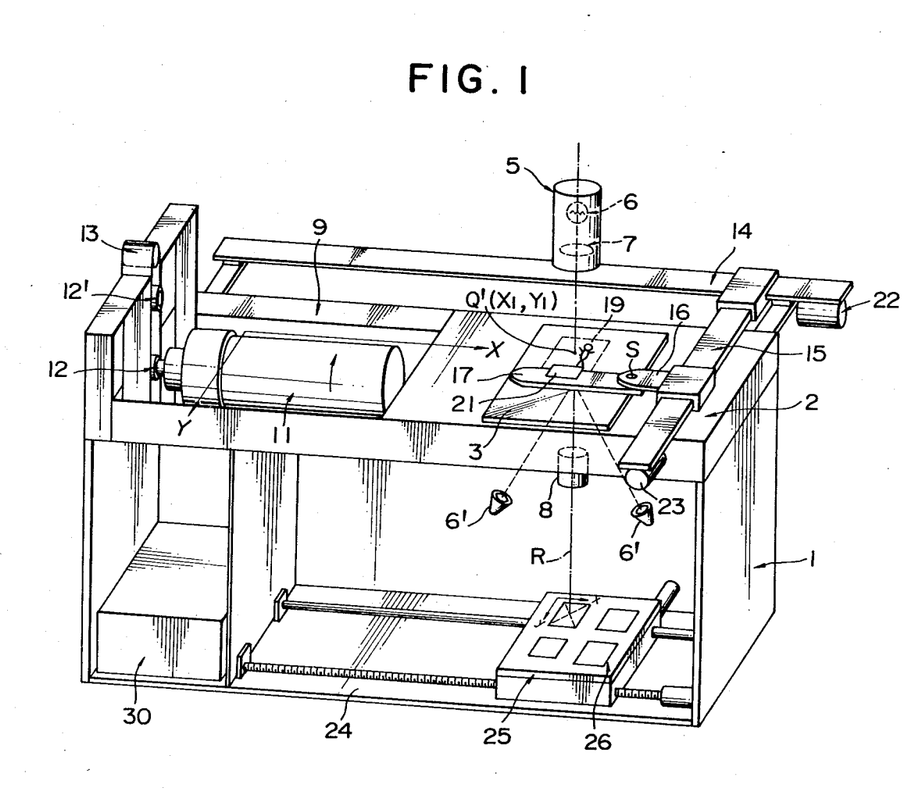
FIG. 1 is a perspective view of an embodiment of the present invention.

In FIG. 1 an original setting-up station 2 having a transparent window 3 at the right side of the upper surface of a frame 1. At the upper part of the window 3 a projector 5 providing with a lamp 6 and a condenser lens 7 is disposed, and vertical optical axis (R) of the projector 5 penetrates an appropriate portion of the window 3, and a zoom lens 8 is disposed on the optical axis (R) of the underside of the window 3. At the left side of the upper surface of the frame 1, a recessed portion 9 is formed, and in the inside thereof a pick-up scanning drum 11 removed from a reproduction scanning apparatus (hereinafter refer to "scanner") is rotatably equipped. To a bearing 12 of the drum 11 there is provided a rotary encoder 13 for measuring rotational angle from a reference position of the drum 11. The drum 11 is removed from the frame 1 and equipped to the scanner after the original picture having been set-up.

In the recessed portion 9 there is provided a second bearing 12', and in the case of an original picture to be set-up being transparent, the first bearing 12 is equipped to the drum 11, and in the case of an original picture being a reflection type, the drum 11 is equipped to the second bearing 12'. When the drum 11 is attached to the scanner body, it is required that its angular position completely coincides with an angular position at a case when the drum 11 is equipped to the bearings 12 and 12' of the apparatus shown in FIG. 1. Accordingly, for example, it is required that a key way provided on a shaft of the drum 11 and a key way provided on the scanner body and relatively same positions of the the two bearings 12, 12' are adapted to fit a key therein.

At the rear part of the upper surface of the frame 1, a guide rail 14 directed in the right and left directions is secured, and with the guide rail 14 a first sliding means 15 which slidingly moves in the front and rear directions is equipped. To the first sliding means 15 a right end of a second sliding means 16 which slides in the right and left directions is slidably equipped, and to a pivot (S) of the left end of the second sliding an original holding arm 17 is rotatably equipped. On the rear edge of the original holding arm 17 an original picture 19 is mounted with an appropriate material, for example, an adhesive tape.

Amount of movement of the first sliding means 15 in the right and left directions is measured by a rotary encoder 22 provided to the guide rail 14, and on the other hand, amount of movement of the second sliding means 16 in the front and rear directions is measured by a rotary encoder 23 attached to the first sliding means 15.

Figure 2:
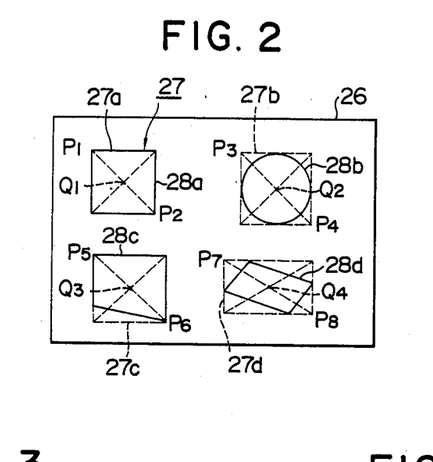
FIG. 2 is a plan view of a layout sheet.

A layout sheet holder 25 is supported by the bottom part 24 of the frame 1 so that it may move in the right and left directions and in the front and rear directions by means of rails (not shown), and to the layout sheet holder 25 a layout sheet 26, shown in FIG. 2, is equipped. On the layout sheet 26 there are drawn the center point and an original point regarding each of rectangulars 27 (hereinafter refer to "trimming area"), considering that a trimming frame(s) 28 which indicates size (i.e., magnification or reduction ratio), form, location and angle of the original picture(s) to be reproduced, and a trimming area(s) 27 having sides in X and Y axes directions which circumscribe with each of the trimming frames 28. In order to previously obtain each of corners of these trimming area(s) 27 and coordinates of the center, each of the above described lines and points are drawn by using a numerically controlled drafting machine. The reason why the trimming area(s) circumscribing with the trimming frame(s) is drawn lies in that in general the scanning area by the scanner is rectangular shape.

Basing on the above mentioned apparatus, operational procedures for loading each of the original pictures on the drum 11, and coordinates relationships among the original picture, the layout sheet and the drum will be described by referring FIG. 1.

According to the apparatus of the present invention, original pictures of both transparent and reflection can be processed, so that at first descriptions will be given for a general case in which the original pictures is transparent.

The original picture 19 is mounted on the original holding arm 17 with a material 21 such as adhesive tape etc. In this case the emulsion side of the original picture 19 is directed downwardly, and in principle the upper side of a picture pattern(s) is general case in which the original pictures is transparent.

The original picture 19 is mounted on the original holding arm 17 with a material 21 such as an adhesive tape etc. In this case the emulsion side of the original picture 19 is directed downwardly, and in principle, the upper side of a picture pattern(s) is defined to be the inner side of the apparatus. However, even regarding an image of the original picture 19 projected onto the layout scanner, it is desired that the image is to be a normally standing one, (that is, image not up-turned), accordingly, it is desired to provide an additional lens (not shown) which focuses again a picture image(s) having been focused by the zoom lens 8.

Each of center points ($Q_1$–$Q_4$) (hereinafter represented by "Q") of respective trimming areas 27 of the layout sheet 26 held on the layout sheet holder 25 is gradually aligned to the optical axis (R) in accordance with movement of the layout sheet holder 25. When this alignment is automatically performed, the holder 25 is once moved to a position at which the origin of coordinates ( when the trimming area etc. are drawn) of the layout sheet 26 is once aligned to the original point of the frame 1, then by basing on each of coordinates values of the respective center points of each of the trimming areas obtained when the trimming areas etc. are drawn, the holder 25 is moved. Thus, the alignment is carried out automatically.

When the alignment is performed manually, such means as projecting a light spot to the position on the optical axis (R), providing a mechanical pointer etc. are applied. Under a status in which the center (Q) of the first trimming area 27 which corresponds to the original picture 19 mounted on the original holding arm 17, the arm 17 is moved, and by projecting a picture image of the original picture 19 on the layout sheet 26 with a desired reproduction ratio, a part of the picture image in the trimming area 27 which corresponds to the original picture 19 becomes a desired scanning area.

When reproduction ratio is previously determined, the zoom lens 8 is set according to the ratio, and when reduction ratio is not previously determined, reduction ratio is adjusted by monitoring the picture image, and then position and angle of the original picture holding arm 17 is adjusted so that a picture image of a desired reproduction area 29 in the original picture 19 may be just fitted thereto. Then, basing on the trimming area 17 drawn on the layout sheet 26, a scanning area can be determined. At the same time, the X-Y coordinates values of the original holding arm 17 are read by outputs of the rotary encoders 22 and 23, and the values are temporarily stored in the memory means (IC memory or floppy disc etc.) in the frame 1 automatically or manually. The data are utilized for determining the required scanning area 28 on the drum of the scanner.

Hereinafter, processes for determining a desired scanning area (trimming frame for the original picture) 29 in the original picture 19 are described.

Figure 3:
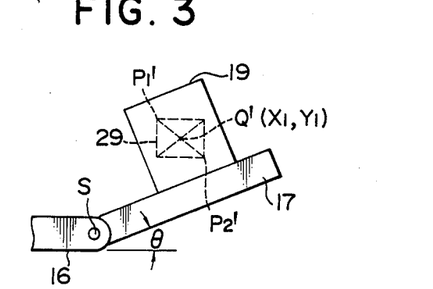
FIG. 3 shows an original holding arm of the embodiment shown in FIG. 1.
Figure 4:
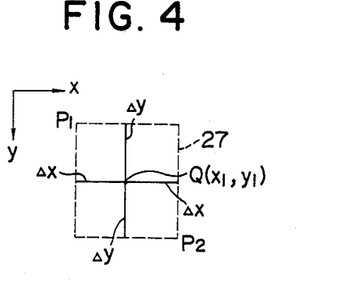
FIG. 4 shows a rectangular area corresponding to a trimming area on the layout sheet.

In FIG. 3, distances between the center point (Q') of the trimming area 27 on the layout sheet and both opposite corner points ($P_1$, $P_2$) of the trimming area 27 are equal, accordingly, assuming that a component in the X direction and a component in the Y direction of the distance to be $\Delta x$ and $\Delta y$, respectively, coordinates values of the points $P_1$ and $P_2$ are, as shown in FIG. 4, represented as follows;

$$P_1(x_1-\Delta x, y_1-\Delta y) \quad (1)$$

$$P_2(x_2+\Delta x, y_1+\Delta y) \quad (2)$$

On the other hand, assuming that coordinates values of a point $(x',y')$ at which the optical axis (R) intersects with the original picture, coordinates values of two corner points ($P_1'$, $P_2'$) of the trimming frame 29 are expressed as follows; that is, $$P_1'(x'-\Delta x/m, y'-\Delta y/m) \quad (3)$$

$$P_2'(x'+\Delta x/m, y'+\Delta y/m) \quad (4)$$

Here, m is reduction ratio, and $\Delta x$ and $\Delta y$ are same as those of shown in (1) and (2).

Basing on the expressions (1) to (4), size and position of the trimming frame 29 in the original picture 19 can be obtained from the trimming area 27 drawn in the layout sheet 26 by calculation.

The above described relates to a calculation process in the case of the center point (Q) of the trimming area 27 on the layout sheet 26 being aligned to the optical axis (R), however, if size and position are within the range of imaging being possible by the optical system 8, position of the trimming area 27 is never restricted thereto. For example, one of the corners of the trimming frame 27 on the layout sheet may be aligned to the optical axis (R), and even in this case corresponding relation between the picture image and the trimming frame can be obtained by calculation. Position of the trimming frame 29 on the drum 11 is determined by loading the original picture 19 on an appropriate position on the circumference of the drum 11. This operation is performed according to the afore-mentioned procedures, that is, by projecting the picture image of the original picture 19, angle and position of the original holding arm 17 are adjusted, and when a desired reproduction area of the original picture 19 is aligned to the trimming area 28 drawn on the layout sheet 26, the angle of the arm 17 is locked, and two read out values ($X_0$, $Y_0$) of the rotary encoders 22 and 23 at the position are stored in the memory means of a computer 30.

Figure 5:
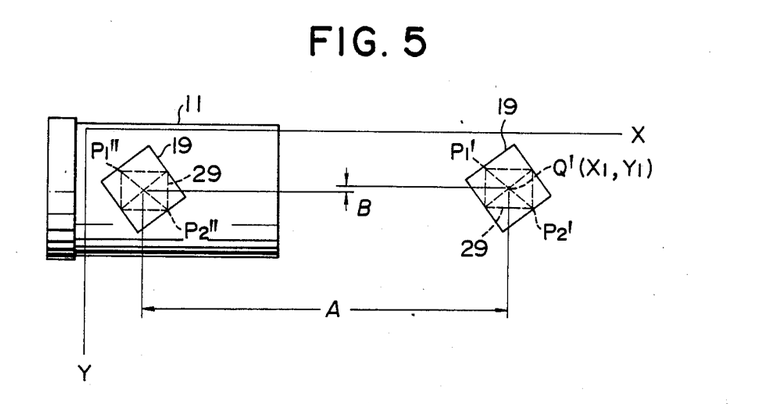
FIG. 5 shows a relationship between an original set-up position and a scanning drum.

Next, as shown in FIG. 5, the original picture 19 is shifted to a suitable unloaded space of the drum 11, loaded the original picture 19 with an adhesive tape, and read out values of the rotary encoders 22, 23 and 13. Assuming that the read out values of the encoders 22 and 23 at the time when the original picture 19 is shifted from the set-up station 2 to that of the drum 11 to be (A, B), and assuming that the read out value of the rotary encoder 13 basing on amount of revolutions from the reference position to be (C), then coordinates values of two diagonal points ($P_1''$, $P_2''$) of the original picture 19 on the drum 11 are as follows, that is, $$P_1''(X_1-\Delta x/m-A, Y_1-\Delta y/m+B+C) \quad (5)$$

$$P_2''(X_1+\Delta x/m-A, Y_1+\Delta y/m+B+C) \quad (6)$$

Thus, the trimming frame 29 which corresponds to the trimming area 27 on the layout sheet 26 in the original picture 19 loaded on the drum 11 can be determined. Accordingly, the coordinates values of two diagonal points ($P_1$, $P_2$) of the trimming area 27 on the layout sheet 26, the read out values of the rotary encoders 22, 23 and 13 and the reduction ratio (m) are input to a computer 30, and by operating them by the computer 30, data of the desired trimming area 29 in the original picture 19 is obtained, and by basing on the data pick-up starting points and ending points in the pick-up scanning are controlled.

In FIG. 5, it is shown a case in which there is a clearance "B" at a position in the Y axis direction of the center of the drum 11 and the original 19 on the setup station 2, however, if required, they may be coincided with each other. In the case of their being coincided with each other, the clause relating to "B" in the coordinates values represented in the afore-described expressions (5) and (6) can be erased, so that operation becomes easier, and further, in the case of reproducing images by loading a transparent typed and a reflection typed original pictures on a drum, calculation of area position data becomes more facile. (The reason therefor lies in the transparent and the reflection typed original pictures are mounted on the arm 17 mutually in upturned form.)

Figure 6:
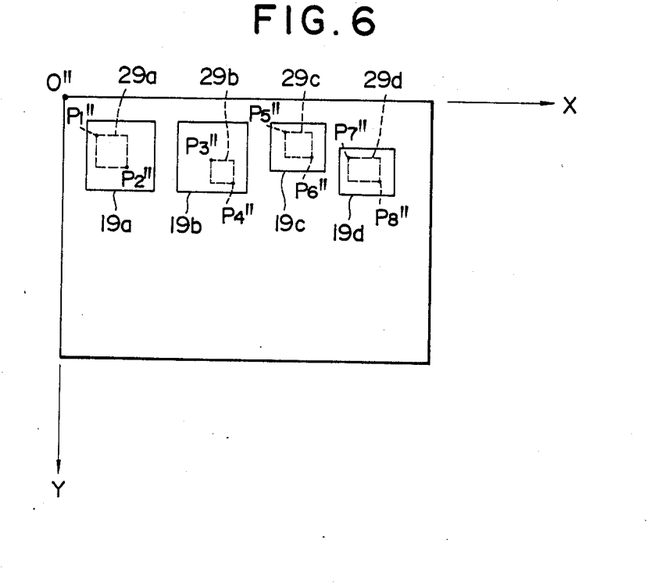
FIG. 6 is a schematic plan view which shows a plurality of original pictures set up on the scanning drum.

Next, with respect to a case in which a plurality of the original pictures are loaded on the drum 11 as shown in FIG. 6, and they are reproduced according to a layout shown in FIG. 7, by basing on image signals obtained by scanning the original pictures will be explained hereinafter referring to a system block diagram shown in FIG. 9.

Figure 9:
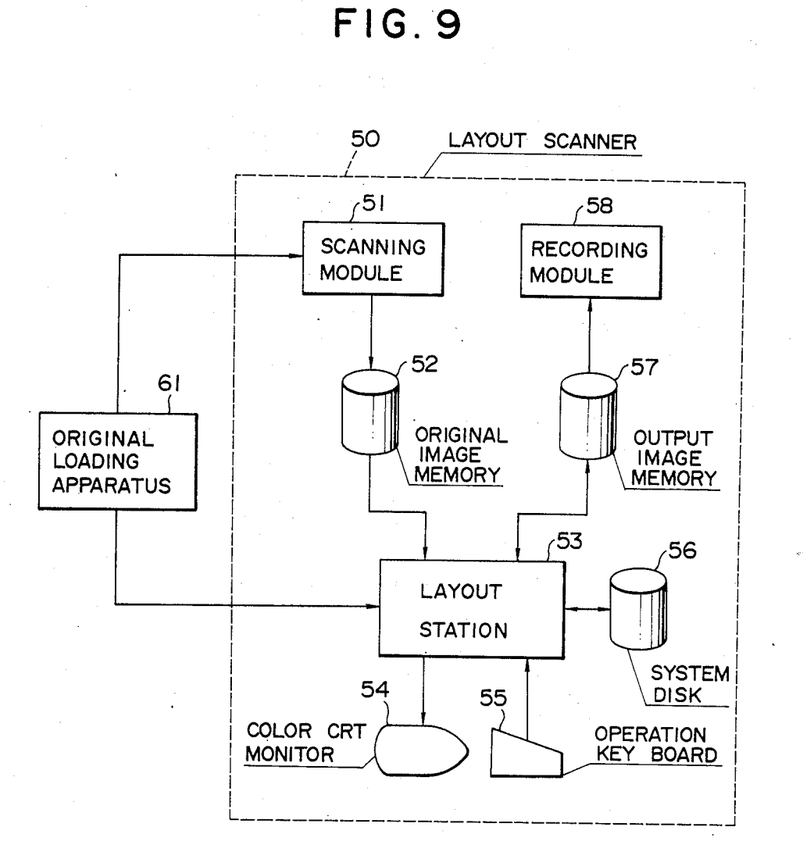
FIG. 9 is a block diagram of a layout scanner system including an original setting up apparatus according to the present invention.

In FIG. 9, the reference number 61 indicates an original picture loading apparatus (frame 1) same as that shown in FIG. 1, and a broken line 50 shows a layout scanner. The drum 11 loaded desired original pictures by the original loading apparatus 61 is installed to a pick-up scanning module of the layout scanner 50. At the same time the apparatus 61 inputs the position data of the trimming area 29 to be picked up in the scanning which is performed according to a desired layout regarding each of the original pictures to the pick-up scanning module 51, the module 51 picks-up and scans each of the original pictures sequentially, and inputs the image signals to an original image memory 52 and stores them sequentially.

The data from the original picture loading apparatus 61 are fed to a layout station 53, the trimming area position data are input to a system disk 56, and are read out therefrom. The layout station 53 converts addresses of the original picture image data stored in the original picture image memory 52 into data of a desired position, by basing trimming area position data, and data read out of the converted data are stored in an output image data memory 57 so that they may be recorded in an area(s) in a reproduced picture image corresponding to a trimming area designated by the layout sheet 26. For example, after a plurality of picture images to be laid out on a full-page have been completed the above described layout designation, the picture image signals are sequentially read out of the output picture image data memory 57, and controlling a recording (or exposing) module of a layout scanner 58 by the picture image signals. Thus, reproduced picture images according to a designated layout are recorded on a recording material (photosensitive film).

As described the above, by providing an original picture loading apparatus of low price to the layout scanner 50 so that it is adapted that, instead of performing an area and position designating work for desired layout by the layout scanner, the work may be carried out by the original picture loading apparatus. In the layout scanner, a result of the desired layout is confirmed by a CRT color monitor 54, and basing on the result confirming that the layout is favorable, operation for transferring group of the picture image data to a desired address(es) of the output picture image memory 27 is carried out. By applying the above described method, production ability of the apparatus can be improved, and construction of the layout station 53 can be simplified. Thus, it is expected that manufacturing cost can be lowered.

Hereinafter, the above described layout workings will be described in detail.

At first, according to a page layout desired by a client, a provisional layout sheet which determines position, form, size and angle of each of trimming frames corresponding to each of picture images is made. There are following two kinds of provisional sheets. One of them is to represent positions at which reference points in the picture image to be reproduced numerically, for designating which picture image is to be reproduced, with which magnification ratio and at which position (and angle) it is reproduced. The other is a layout sheet on which these reproduction factors are roughly sketched, and if required, those factors may be numerically entered.

When positioning of the picture image(s) may be relatively rough, a layout sheet mentioned above can be applied, however, in order to obtain reproduction of higher quality, a precise layout sheet such as the layout sheet 26 shown in FIG. 2 is formed by using a numerically controlled drafting machine etc.

When the layout sheet 26 is formed, the origin of the layout sheet, each of the center points of the trimming areas $(Q_1)-(Q_4)$ are drawn, according to the necessity therefor. The data used in forming the layout sheet 26 is input directly or through temporary memory means such as floppy disk etc. to the original loading apparatus 61 and the system disk 56. The trimming area of the original picture 29 (FIG. 6) is that which transfers each of trimming areas 27a, 27b, 27c and 27d of the layout sheet 26 by considering magnification ratio and applying the apparatus 61 to the original pictures 19. In the apparatus 61 the respective trimming areas is determined per each of the original pictures 19, and the original pictures 19 are set onto the drum 11 (FIG. 1) of the scanning module 51 of the layout scanner 50.

As described the above, for example, as shown in FIG. 6, a plurality of desired original pictures 19 are set onto the drum 11, and regarding each of two points $(P_1'',P_2''),(P_3'',P_4''),(P_5'',P_6'')$ and $(P_7'',P_8'')$ in each of the trimming areas 29a–29d of the original pictures 19a, 19b, 19c and 19d, position data from the origin point (0'') are obtained, and the data are used in the scanning station 51 as control signals for selectively picking up necessary picture image area.

In the case shown in FIG. 6, the drum 11 on which 4 original pictures 19 have been set is detached from the original picture loading apparatus 61 and equipped to the scanning station 51, then, by pick-up scanning each of the original pictures 19, and basing on the position data of above described two points in each of the trimming areas, the picture image data in the trimming areas (29a–29d) are magnified or reduced according to desired ratio and stored in the original picture image memory 52.

Each of the picture image data stored in the original picture image memory 52 is data which correspond to the trimming area 27 on the layout sheet 26, and the stored area is that of well known, and that even a position(s) which is occupied by the picture image in a reproduced pattern is obtained when the layout sheet 26 is formed. Accordingly, relation between an address(es) for reading desired image data out of the original picture image memory 52 and an address(es) for storing the picture image data to a predetermined area of the output image memory 57 can be obtained by adding and/or subtracting a constant value which is defined at every original image in the X and the Y directions. That is, though the original picture image memory 52 and the output picture image memory 57 are devices independent with each other, usually both of them are magnetic disks which process two dimensional image data of the same kind, and address conversion in data transferring between the both devices can be achieved merely by adding and/or subtracting a constant value in the X and the Y directions.

According to the above described procedures, the original image data in the trimming area 29 of each of the original pictures 19 can be stored in an area of the output image memory 57 corresponding to a designated area of the layout sheet 26. However, in the case of a form of a picture image to be actually reproduced being other than a rectangle shown in FIG. 7 as three kinds of shapes (28b'''), (28c''') and (28d'''), if the all stored picture image data are output to the recording module 58 what they are, all the picture image data stored in the rectangular shape are to be reproduced, so that it is required to output the picture images after erasing unnecessary parts of each of the picture images. Several methods can be applied to erase the unnecessary parts of the picture images, that is, they are as follows:

A method for transferring image data which are only within the trimming frame 28 of each of the original pictures, when data are transferred to the output image memory 57 from the original picture image memory 52;

A method in which the image data in the trimming area 27 of each of the original pictures are stored in the output image memory 57, and when the picture image data are input to the recording module 58 from the output image memory 57, image data only within the trimming frame 28 of each of the original pictures are output;

A method in which image data in the trimming frame 28 are selected and stored in the original picture image memory 52, when signals picked-up by the scanning module 51 are stored in the memory 52; etc. These methods are identical process in fundamental, and difference lies only in at which step masking image data which are only in the trimming frame 28 is to be carried out. Accordingly, it is considered that if one of the above described methods can be understood, other methods may be also clearly understood, therefore, the first method will be described hereinafter.

Figure 7:
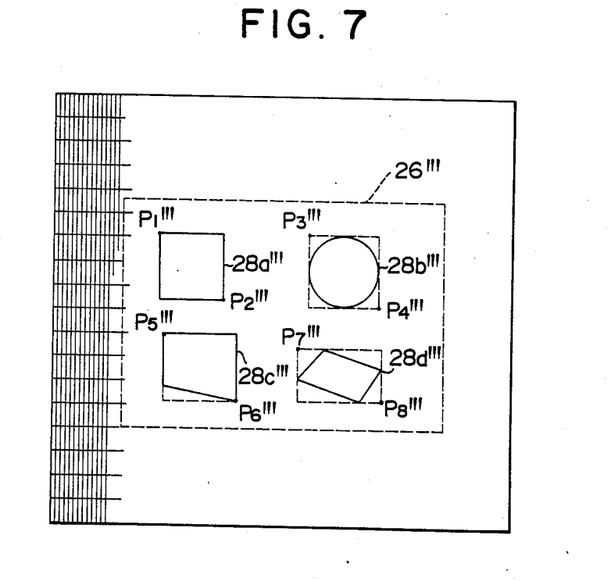
FIG. 7 shows a layout sheet alike to the layout sheet as shown in FIG. 2 with supposed (imaginary) scanning lines.

In a numerical controlled drafting machine, basing on data at the time when the trimming frame 28 of each of the picture images is drafted, a memory area (26''') corresponding to an effective recording area of the recording drum of the output module 58 shown in FIG. 7 is provided to the system disk 56, and a "master data" which defines inner sides of the trimming frames of all of the picture images shown as (28a''') to (28d''') in FIG. 7 to be [1], and defines all the remaining areas to be [0] is provided.

The rectangular trimming area 27 of each of the picture images, that is, the image data of ($P_1'''$,$P_2'''$), ($P_3'''$,$P_4'''$), ($P_5'''$,$P_6'''$) and ($P_7'''$,$P_8'''$) are stored in each of designated areas of the original image memory 52, positions (areas) of the photosensitive film on which the trimming frames (28a'''), (28b'''), (28c''') and (28d''') are to be recorded are already known, and an address in the original image memory 52 and an address in the output image memory 57 correspond with each other with relation of 1:1.

Accordingly, master data of the system disk 56 which correspond to the address of the area 26''' shown in FIG. 7 are read out in sequent order from the head to the tail thereof, regarding any address of which data is [1] (that is, the trimming frames (28a''')–(28d'''), picture image data of an address(es) corresponding to the original picture image memory 57 are read out, and then the data are transferred to desired address(es) of the output image memory.

The picture image signal having been subjected to layout processing by the above described process is output to the recording module 58 so as to expose desired reproduction images. The picture image signal may be directly transferred to a recording system (means of similar construction to that of the recording module 50) disposed out of the layout scanner 50 shown in FIG. 9 by a telegraph cable etc., or also may be stored in the magnetic tape or disk and transferred indirectly to record them.

The above descriptions concern the case in which the original picture(s) is transparent (in general the most popular case), but with respect to another embodiment in which the above mentioned means are partially modified so that the apparatus may be applied to the original picture of reflection type description will be given by referring to FIG. 8.

Figure 8:
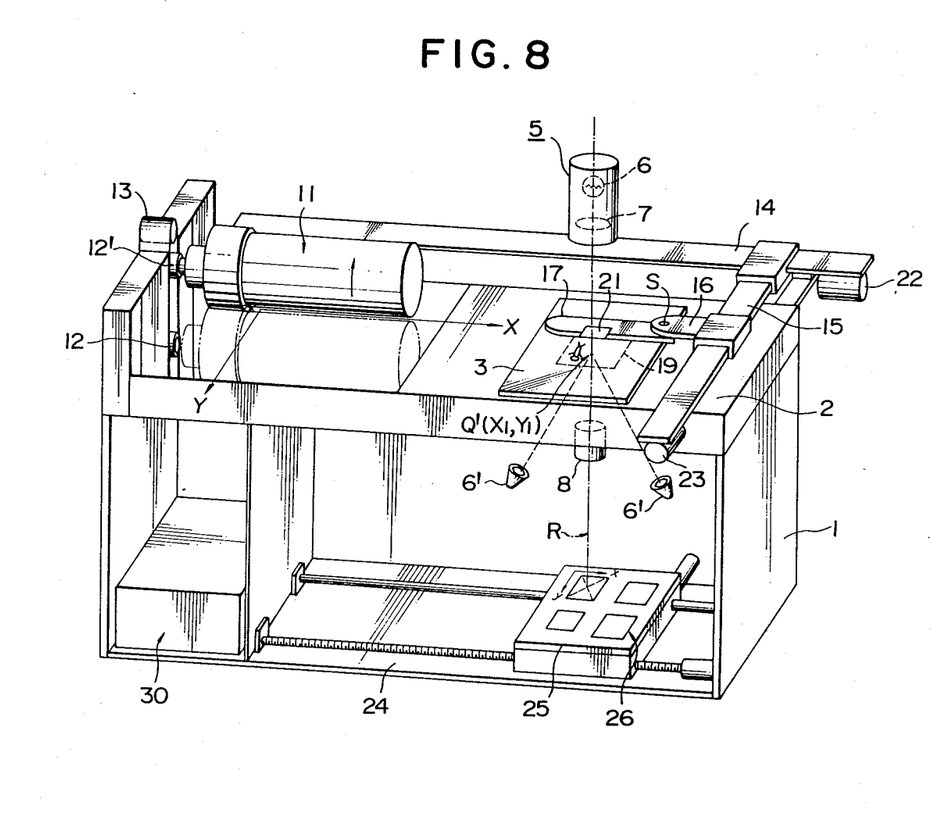
FIG. 8 shows a same apparatus as shown in FIG. 1 which is applied for setting-up a reflection type original picture.

An apparatus shown in FIG. 8 is fundamentally same as that of the apparatus shown in FIG. 1. At the lower part of the window 3 there are provided a pair of lamps 6' for illuminating the the original picture of reflection type 19', and the drum 11 is equipped to a second bearing 12'. Height of the second bearing 12' is determined so that the lower edge of the drum 11 equipped to the second bearing 12' may be the same level as the original picture holding arm 17.

The original picture of reflection type (19') is mounted on the arm 17 by facing the image side thereof to the underside, and position and angle therefor are adjusted according to the case of processing the original picture of transparent type. Then, the picture image 19' is moved downwardly by maintaining the angle as it has been set, and it is loaded on the drum 11 with the image side thereof facing to the outside. As well as the case of the original picture of transparent type, in the case of the reflection type, amount of revolution of the drum 11 is read out, same as that of the former case, by the rotary encoder 13. Positions of the original points in the two bearings 12 and 12' and read out values thereof by the rotary encoder 13 are coincided with each other.

In the case of the original picture of reflection type 19', it is desired that the original picture 19' is mounted to the original picture holding arm 17 in an up-turned form. The reason lies in that when the original picture of reflection type is loaded on the drum 11, it is set to the same direction as that of the case of the transparent type. However, in this case the picture image projected onto the layout sheet 26 by the optical system 8 becomes that of up-turned one, so that direction of the picture image is turned by adding an image turning device such as "Dove prism" etc. to the optical system 8.

By adding the above described modification, the apparatus according to the present invention can load the original picture(s) of reflection type on the drum 11. Obtaining method for obtaining trimming area and method for determining the scanning start point and the finish point may be calculated quite same as those of the former case (the case of processing the original picture of transparent type).

Heretofore, descriptions are developed so that the original picture 19 or the original picture 19' mounted on the original holding arm 17 is loaded directly on the drum 11, however, it is also possible to load each of the original pictures on the drum 11 by pasting them on a base sheet and rounding up the base sheet on the drum 11. In this case, in the apparatus shown in FIGS. 1 and 8, instead of the drum 11 a plane top table of the coplanar with the set-up station 2 is provided to hold the base sheet, and the base sheet is mounted on the original picture holding arm 17 by the set-up station 2. Then, the original pictures which are determined their positions and angles are moved to desired positions of the base sheet sequentially and pasted thereon, and the base sheet on which the original pictures are pasted is rounded up on the drum 11 for loading the original pictures.

In order to align the origin points of the base sheet and the drum, each of register pins is mounted at relatively identical positions of the table and the drum, and by fitting these pins with punch holes bored on the base sheet, registering is performed. Further, in order to perform pasting of the original pictures exactly, it is desired to make the plane top table to be a vacuum hold type which can fix the base sheet to be a complete plane.

What is claimed is:

1. A method for recording plural images trimmed by basing on size and angle of a desired layout by an image reproducing scanner, characterized by comprising the following steps:

moving sequentially one or a plurality of frames on which each of said images to be reproduced relatively to an optical axis by maintaining a layout sheet which represents an area frames on a projecting plane of a projector on which the original picture images are to be projected;

mounting the original pictures to be reproduced on said projected area frames on an original picture holder which is movable and rotatable along a plane intersecting perpendicularly with the optical axis, and projecting said original picture images within the area frames on the layout sheet;

focusing the desired areas on which the original picture images are projected, by adjusting sizes and angles thereof according to magnification ratio of said projector and movement of said original picture holder, so that the desired areas may align to said area frames represented on the layout sheet;

loading the original pictures having been determined their positions and angles on a pick-up scanning drum of a scanner disposed on the coplane said original picture holder in maintaining the angles after having been transferred them thereto;

storing said magnification ratio of said projector, the positions of the original pictures, positions of said area frames on said layout sheet and amount of rotated angle from an origin position of said pick-up drum when the original pictures are loaded as a control data for said scanner;

repeating the above described steps for all original picture which are desired;

setting said pick-up scanning drum on which each of the original pictures are loaded; and recording reproduced patterns by controlling said scanner according to said controlling data.

2. An apparatus for recording plural images as reproduced images with a size and a form according to a desired layout by an image reproducing scanner on a recording material characterized by comprising:

an optical projector which projects images of original pictures on a projecting plane with a desired magnification;

an original picture holding means maintaining sequentially each of said original pictures movably and rotatably in a plane which intersects with said optical axis of said projector;

a layout sheet being maintained movably in a focus plane of said original picture images held by said original picture holding means and intersecting perpendicularly with said optical axis, and on which a plurality of trimming frames which indicate size and form by which each of desired areas of the respective original pictures;

a drum holding means being provided with a rotatable pick-up scanning drum removed from said scanner and in the range of movement of said original picture holding means so that an edge of said pick-up scanning drum may be substantially coplanar with a moving plane of said holding means; and a signal controlling means which stores data such as a magnification ratio of said optical projector, a desired position of said original picture holding means, each of positions of the respective trimming frames on said layout sheet and an amount of rotation from a reference position of said drum when each of said original pictures are loaded, as control information, and which exposes reproduced patterns of a desired layout by controlling the scanner according to said control information when said original pictures loaded on said pick-up scanning drum are reproduced by said scanner.

* * * * *